Nov. 29, 1927.
H. L. YOUNG
1,650,971
CONVEYER
Filed Feb. 18, 1925      2 Sheets-Sheet 2
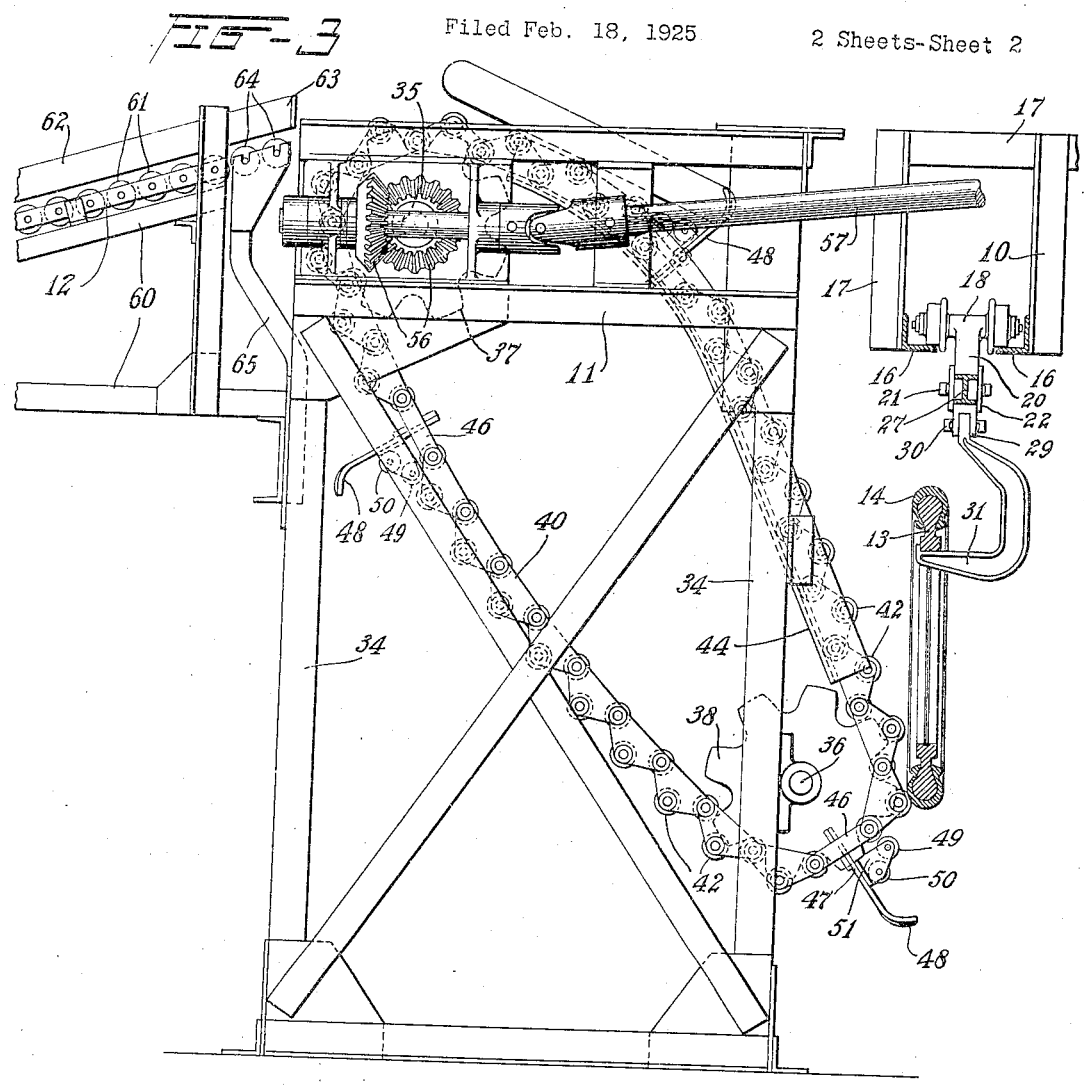
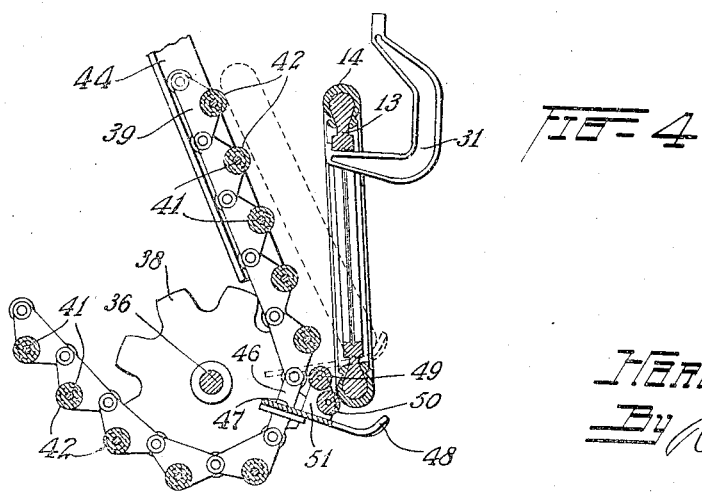

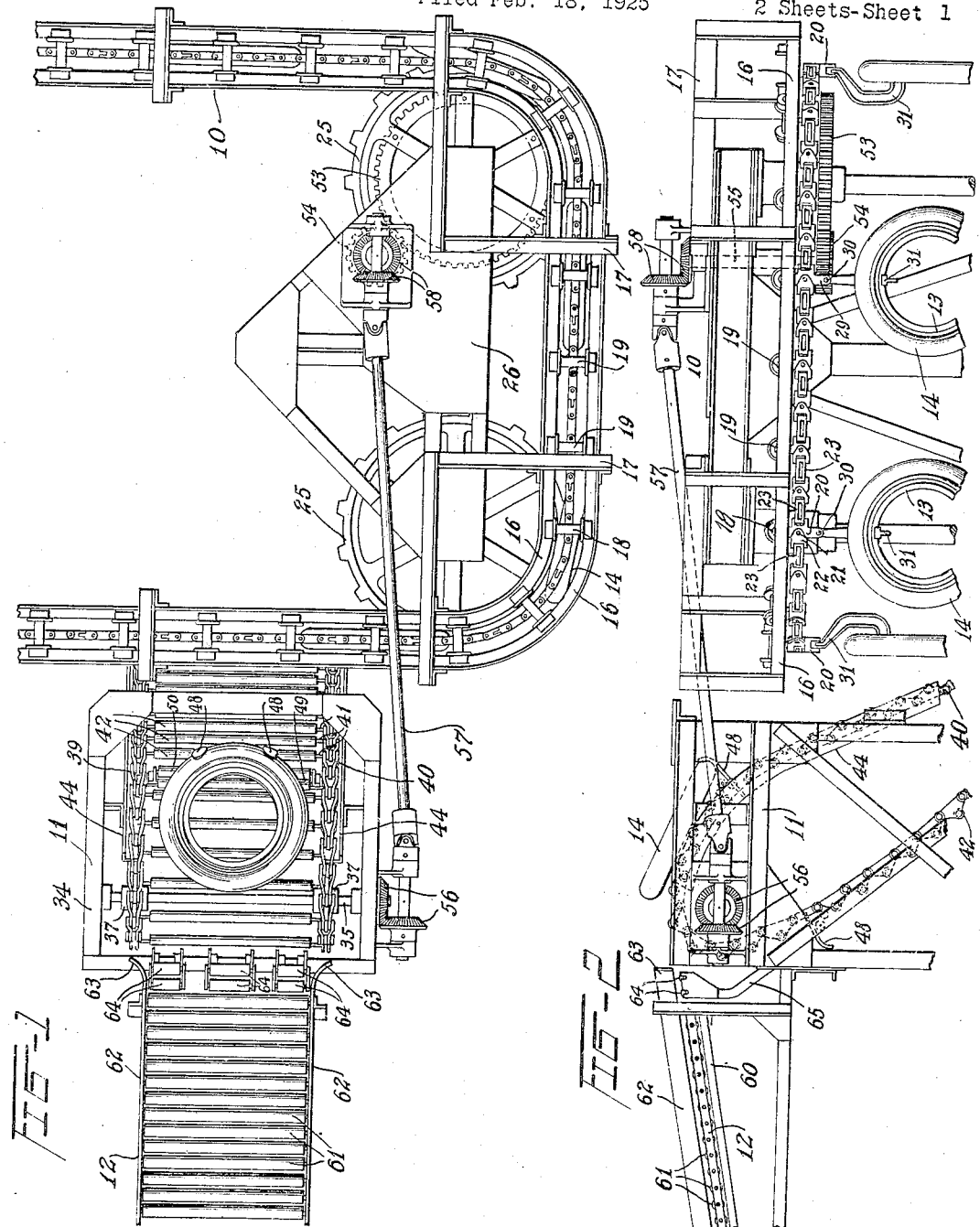

Patented Nov. 29, 1927.

1,650,971

UNITED STATES PATENT OFFICE.

HARVEY L. YOUNG, OF AKRON, OHIO, ASSIGNOR TO THE B. F. GOODRICH COMPANY, OF NEW YORK, N. Y., A CORPORATION OF NEW YORK.

CONVEYER.

Application filed February 18, 1925. Serial No. 9,938.

This invention relates to apparatus for unloading tire-cores from a suspension carrier on which the tire-cores are pendently supported, and it has for a primary object to provide an apparatus of this character which shall automatically remove successive tire-cores from the suspension carrier and transfer them to a region removed from the carrier. A further object is to provide a conveyer-unloading apparatus which shall elevate the tire-cores while removing them in a direction transverse to the travel of the suspension carrier and deliver the cores in a horizontal position to a second conveyer.

Of the accompanying drawings:

Fig. 1 is a plan view of apparatus embodying my invention in its preferred form.

Fig. 2 is a side elevation of the apparatus of Fig. 1.

Fig. 3 is a side elevation, drawn to an enlarged scale, of the conveyer-unloading apparatus, the suspension carrier and tire-core supported thereon being shown in section.

Fig. 4 is a section through the lower end of the conveyer-unloading apparatus showing the means for tilting the tire-core prior to raising it from the supporting hook of the suspension carrier.

Referring to the drawings, the apparatus comprises a suspension carrier 10, an unloading device 11, and a conveyer 12 of a roller-table type, these instrumentalities being so juxtaposed with relation to each other that tire-cores 13, with tires 14 thereon, as for example from a series of tire building machines (not shown), may be conveyed by the suspension carrier to the unloading device 11, removed thereby from the carrier 10 and transferred to the conveyer 12.

The suspension carrier 10 consists of a pair of over-head rails 16, 16, which are supported from above by suitable framework 17, said rails being adapted for the mounting thereon of the wheeled carriages or trolleys 18, 19. The trolley 18 comprises a rigid suspension member 20 horizontally apertured to receive a clevis pin 21 mounted in the apertured forks of a clevis member 22, said forks straddling the suspension member 20. The opposite end of the clevis member 22 is formed with upper and lower forks straddling and pivotally connected to a sprocket link 23, which is adapted to mesh with guiding and driving sprockets 25, mounted on vertical axes in a frame 26.

The suspension member 20 is formed with a projection 27 opposite the clevis member 22, apertured to receive the pivot pin of a sprocket link 23. A forked downward extension 29 of the member 20 is apertured to receive a pivot pin 30 which extends through the apertured shank of the carrier hook 31, said hook being adapted freely to receive and to support a tire-core 13 hung thereon.

Between the load carrying trolleys 18, other trolleys 19, not provided with the hook-supporting, downward extensions, serve to support the sprocket chain and to facilitate its smooth operation in making turns about the driving and guiding sprockets.

The unloading device 11, for removing the cores from the hooks 31 comprises, as shown clearly in Fig. 3, a frame 34 in which are journaled shafts 35, 36 for two pairs of end sprockets 37, 37, 38, 38, upon which are mounted a pair of parallel, endless, inclined elevator chains 39, 40. Opposite links of the chains 39, 40 are connected by respective shafts 41, 41, upon which are loosely journaled rolls 42, 42. The upper reach of each chain is slidably supported by flange members 44 secured to the sides of the frame 34 and so curved as to turn a tire-core, resting on the rolls 42, gradually to a horizontal position for delivery onto the conveyer 12.

For automatically removing the tire-cores from the carrier hooks 31, certain links 46 of the chains 39 and 40 are connected by webs 47 rigidly secured to the links 46 and formed with outwardly projecting, forked-hook portions 48, 48, adapted to engage under the tire-cores 13 as the latter arrive at the unloading device. For tilting each core prior to its being lifted by the hooks 48, so that it will be caused by gravity to lean against the rolls 42, two rolls 49 and 50 are loosely journaled between end plates 51 secured to the web 47, said rolls 49 and 50 being at such positions, just in advance of the hooks 48, as to engage the lower portion of a tire-core and crowd it into the inclined position shown in full lines in Fig. 4.

The unloading device 11 has such driving connection with the driving sprockets 25 of the suspension carrier 10, as to be driven thereby in timed relation, so that the forked-hooks 48 will arrive at the tire core engaging position simultaneously with the arrival of a tire-core. As shown, the shaft of a sprocket 25 has secured thereto a gear wheel 53 which meshes with a spur gear 54 carried on a vertical shaft 55 journaled in the frame 26. The shaft 35 is provided at one end with beveled gears 56, which through the intermediary or flexible shafting 57 and beveled gears 58 at one end of the shaft 55 serve to coordinate the rotation of the sprockets 25 of the carrier 10 and of the sprockets 37 of the unloading device 11.

The conveyer 12 may be of any type adapted to carry a tire-core disposed in horizontal position, and, as shown, is a gravity conveyer consisting of side frames 60 in which are journaled an inclined series of rollers 61. A guard rail 62 extends along either side of the rollers 61 and is flared at 63 to direct the tire-cores from the unloading device 11 onto the conveyer 12. Three sets of spaced rollers 64 are shown supported on brackets 65 secured to frame 34. These rollers 64 serve to bridge the gap between the device 11 and conveyer 12 and permit the forks of the hooks 48 to pass therebetween as they turn around the sprockets 37 to the lower reach of the endless-conveyer of the unloading device 11.

In the operation of the apparatus, the tire-bearing cores, as each tire is built up, are removed from the tire-building machines and hung upon the hooks 31 of the suspension carrier 10, which passes conveniently near a series of tire-building machines. The tires on the cores are then carried to the unloading device 11, located, for example, in the vulcanizing room. As the successive tires arrive at the unloading device 11, they are first swung outwardly by contact with the rollers 49, 50, and then lifted by the engagement of the forked-hooks 48 with the under side of the tires, the tire-cores falling of their own weight onto the rollers 42, thence they are carried upwardly, turned to a horizontal position and pushed onto the gravity conveyer 12, which directs them to the vulcanizer stands (not shown).

The operation of the unloading device, being coordinated in its movements with the travel of the suspension carrier 10 requires no attendant, and is completely automatic in its action of removing the tire-cores from the suspension carrier 10.

I claim:

1. An apparatus for conveying annular bodies comprising a suspension carrier including a spaced-apart series of hooks adapted pendently to support respective annular bodies hung thereon, and mechanism engaging under the lower part of each successive annular body at a predetermined point in the travel thereof for relatively lifting the annular body free from its supporting hook, each of the said hooks being so mounted as to resist being swung in the direction of a hooking or unhooking movement.

2. Apparatus as defined in claim 1, in which the mechanism comprises a device including spaced-apart hook-elements adapted to lift successive annular bodies free from the supporting hooks of the suspension carrier.

3. Apparatus as defined in claim 2, in which the lifting device comprises an inclined endless-conveyer.

4. An apparatus for conveying annular bodies comprising a suspension carrier including a spaced apart series of hooks adapted pendently to support respective annular bodies hung thereon, and mechanism adapted for engaging the lower part of each successive annular body at a predetermined point in the travel thereof, first swinging the body out of a vertical plane and then relatively lifting the body to cause the top thereof to swing free of the supporting hook, each of the said hooks being so mounted as to resist being swung in the direction of a hooking or unhooking movement.

5. An apparatus for conveying annular bodies comprising a suspension carrier including a spaced apart series of hooks adapted pendently to support respective annular bodies hung thereon, and mechanism adapted for engaging the lower part of each successive annular body at a predetermined point in the travel thereof, first swinging the body out of a vertical plane and then lifting the body to cause the top thereof to swing free of the supporting hook, the said mechanism comprising an inclined, endless-conveyer having hook-elements thereon adapted to engage under the lower part of the annular body, in combination with means for swinging each annular body out of a vertical plane to cause it to tilt onto said conveyer as it is lifted by the hook-elements.

6. An apparatus for conveying annular bodies comprising a suspension carrier including a spaced apart series of hooks adapted pendently to support respective annular bodies hung thereon, and mechanism adapted for engaging the lower part of each successive annular body at a predetermined point in the travel thereof, first swinging the body out of a vertical plane and then lifting the body to cause the top thereof to swing free of the supporting hook, the said mechanism comprising an inclined endless-conveyer having spaced-apart hook-elements protruding therefrom for lifting the successive annular bodies from the said supporting hooks, and rollers disposed in advance of said hooks for tilting the annular bodies prior to the lifting engagement of the hook-elements with the annular bodies.

7. An apparatus for conveying annular bodies comprising a conveyer pendently carrying annular bodies in substantially vertical planes, a second conveyer carrying annular bodies in substantially horizontal planes and at a higher elevation than said first conveyer, and an inclined endless conveyer having means adapted to lift the annular bodies from the first conveyer, move them upwardly upon the inclined conveyer and slide them in a horizontal position onto the second conveyer.

In witness whereof I have hereunto set my hand this 14th day of February, 1925.

HARVEY L. YOUNG.